Figure 1:
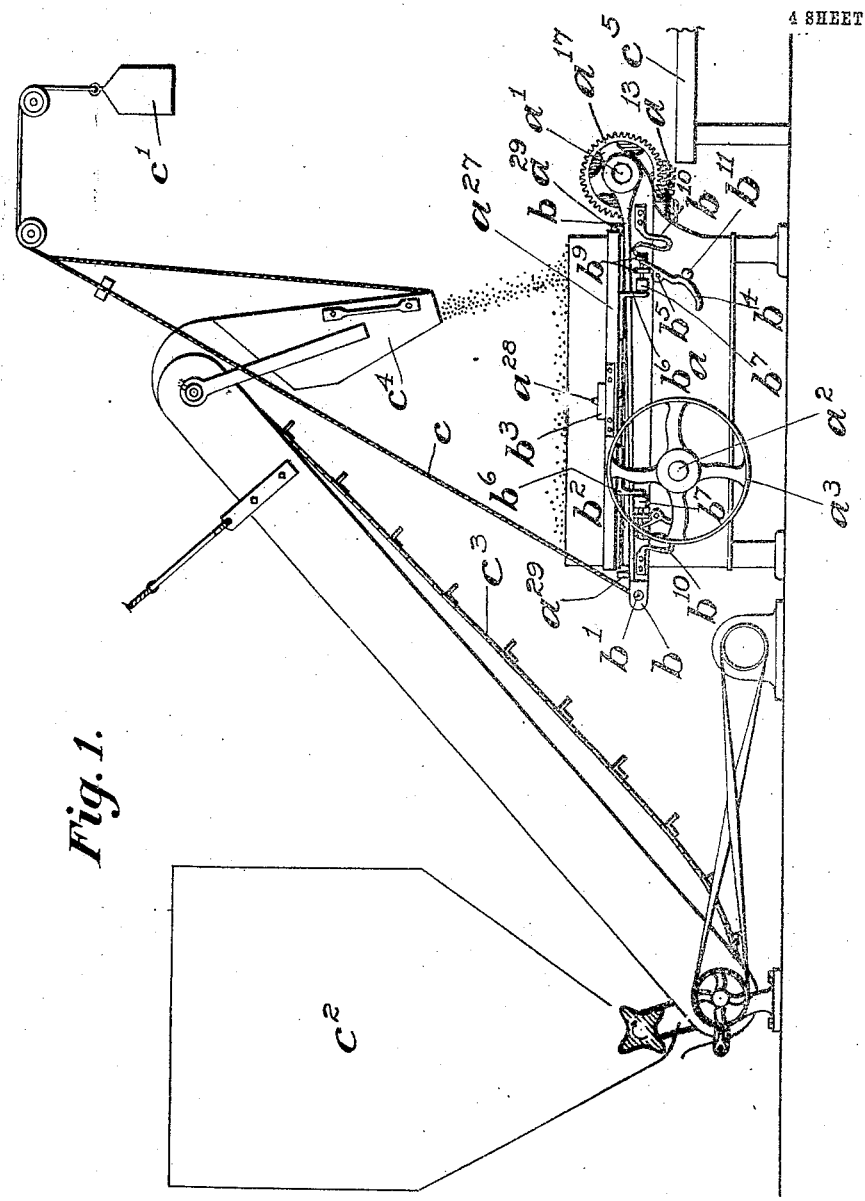

No. 863,611. PATENTED AUG. 20, 1907.
O. W. KELLY.
MOLDING MACHINE.
APPLICATION FILED MAR. 25, 1907.

4 SHEETS—SHEET 1.

Witnesses
W. H. Christman
Chas. I. Welch

Oliver W. Kelly Inventor
By Staley and Bowman
Attorneys

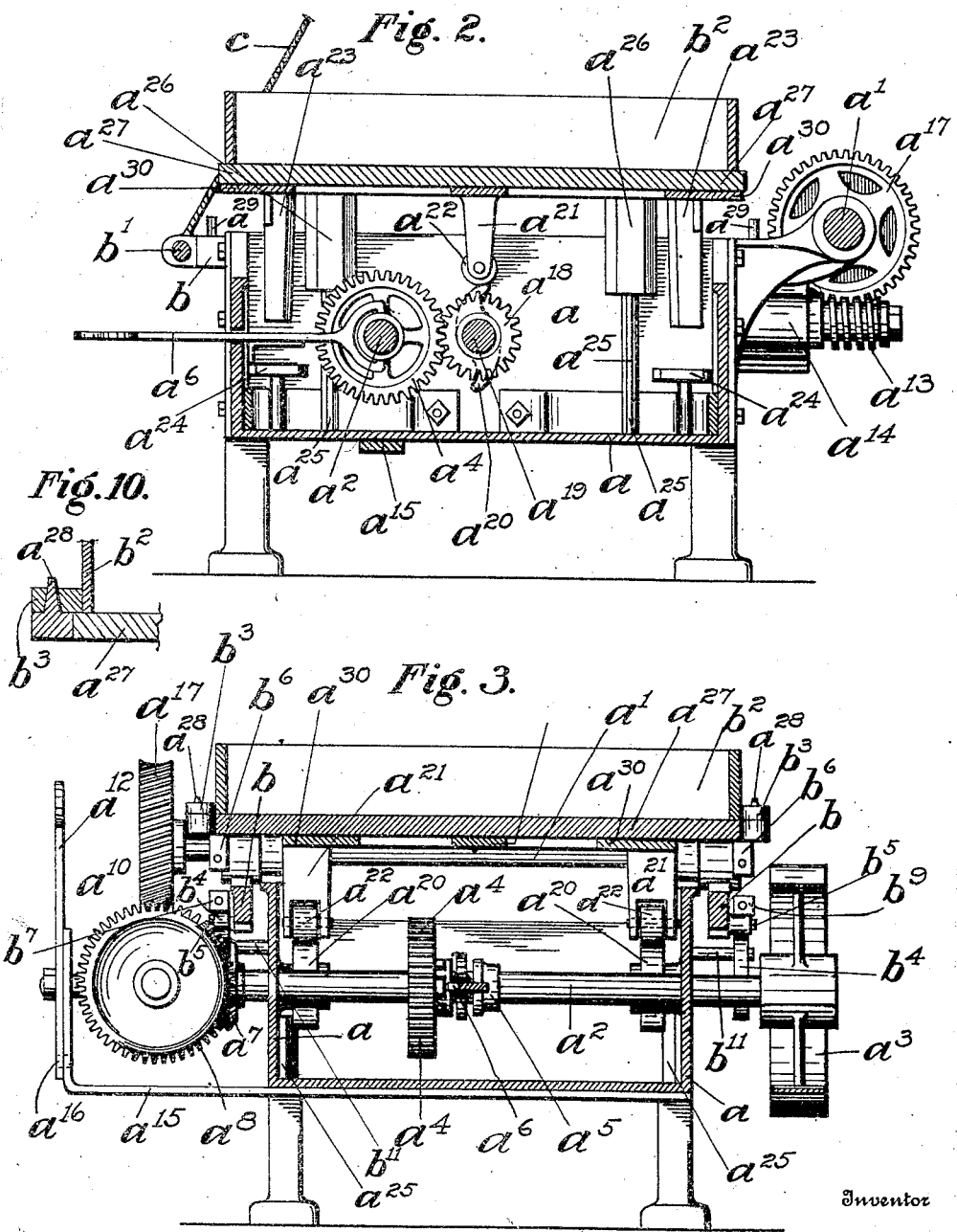

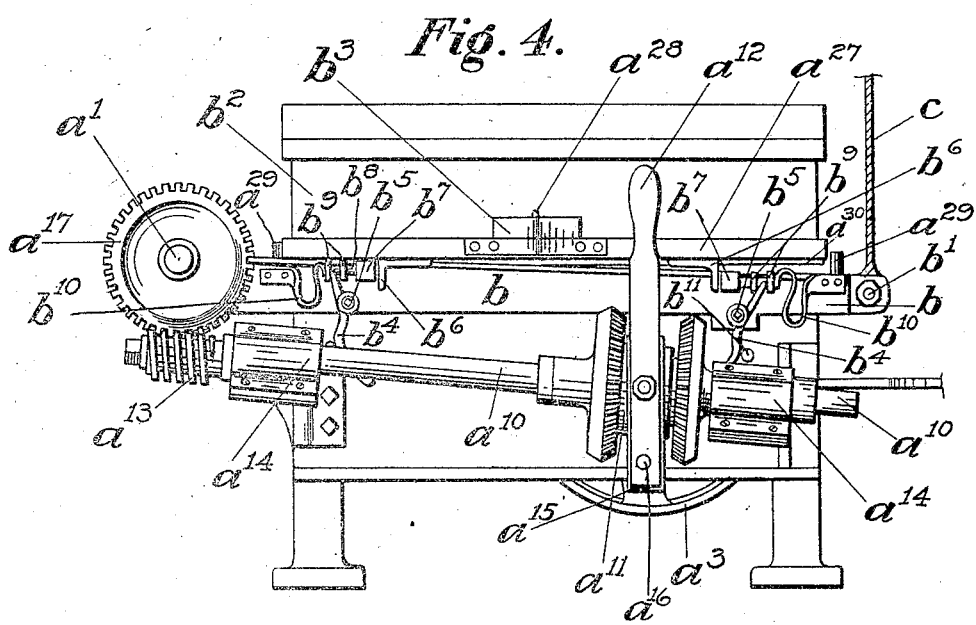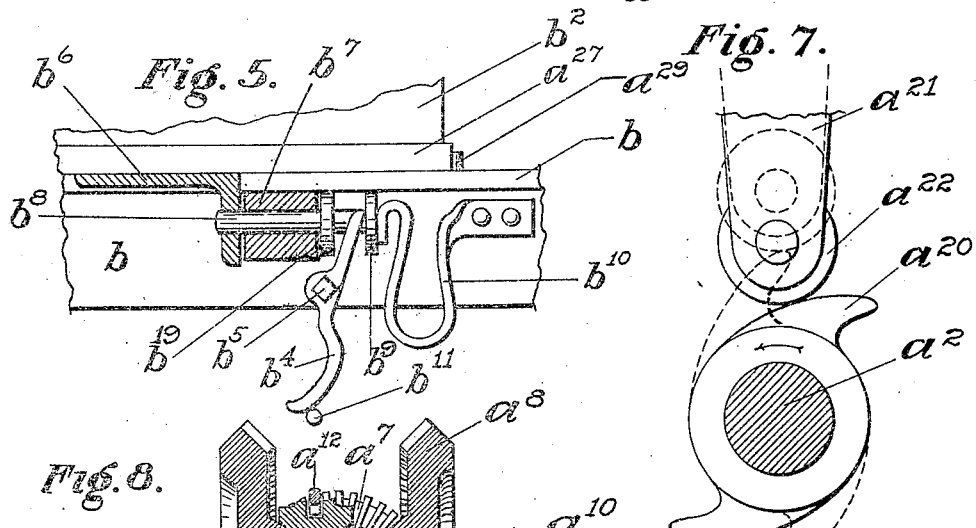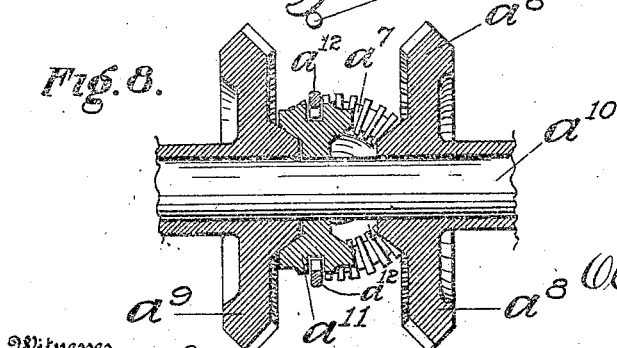

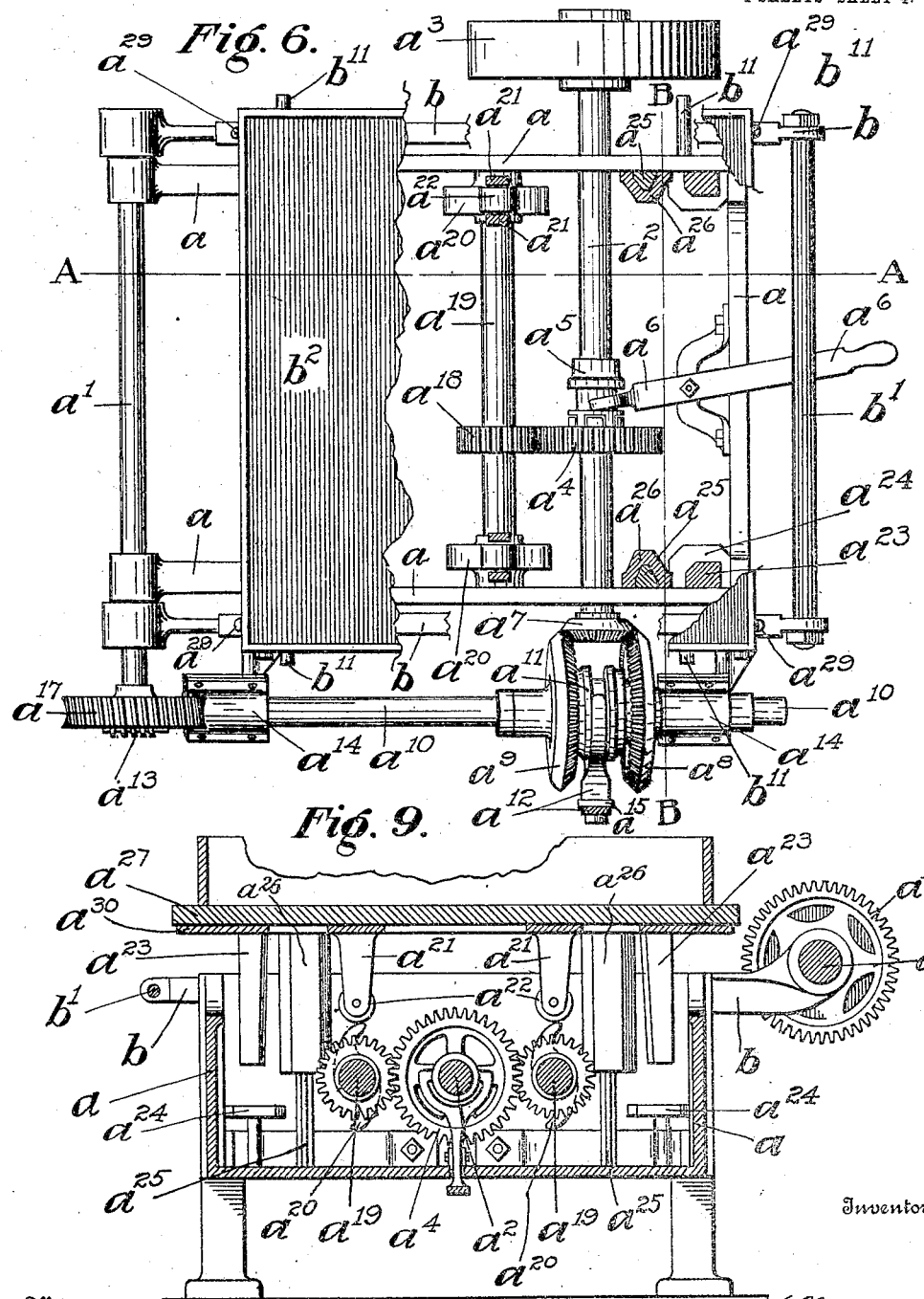

UNITED STATES PATENT OFFICE.

OLIVER W. KELLY, OF SPRINGFIELD, OHIO.

MOLDING-MACHINE.

No. 863,611.  Specification of Letters Patent.  Patented Aug. 20, 1907.

Application filed March 25, 1907. Serial No. 364,436.

*To all whom it may concern:*

Be it known that I, OLIVER W. KELLY, a citizen of the United States, residing at Springfield, in the county of Clark and State of Ohio, have invented certain new and useful Improvements in Molding-Machines, of which the following is a specification.

My invention relates to improvements in molding machines, and particularly relates to a power-operated molding machine such as to dispense with a vast amount of manual labor.

The work to which I have applied this machine and one purpose for which it is particularly adapted is molding of piano plates, where owing to the light and heavy parts of the casting considerable skill is required in molding and ramming of the sand, and where, also, the flask containing the mold are exceedingly large and heavy and the work of handling the molds and flask when performed by manual labor is very great.

The object of the invention is to construct a power-operated machine that will effect in large part a very desirable kind of ramming of the sand and dispense with the manual labor of ramming, and such that the arrangement permits the easy handling of the mold and flask containing the mold, requiring simply the proper operating of the machine to effect a complete mold of a casting. Broadly speaking, my invention utilizes a subvertible swinging frame to which the follow-board of the flask is supported and the arrangement is such that the follow-board and flask can be vibrated by power in a manner to accomplish the proper ramming for heavy and light backing of sand, and I have shown a complete machine so arranged that the sand is conveyed by power to the flask, the sand rammed by power and the follow-board automatically released from the swinging frame when it is in normal position and automatically fastened to the frame in all other positions.

In the drawings, Figure 1 is a side view of the complete mechanism showing the conveyer and the molding machine in their associated positions. Fig. 2 is a sectional view taken on the lines A A Fig. 6. Fig. 3 is a sectional view taken on the lines B B Fig. 6. Fig. 4 is a side view of the molding machine. Fig. 6 is a plan view of the molding machine. Figs. 5, 7 and 8 are detail views of the parts thereof. Fig. 9 is a modification showing the vibrating mechanism for large-sized machines. Fig. 10 shows a detail of the tapered guides.

Like letters of reference indicate like parts throughout the several views.

In my machine, the stationary frame for the molding machine is indicated by $a$ (Figs. 1 and 6). There is supported upon the stationary frame a driven shaft, $a^1$, and the main operating shaft is indicated by $a^2$, (Fig. 6). A pulley, $a^3$, is shown for applying power to the main operating shaft. There is loose on this shaft, $a^2$, near the center thereof a gear wheel, $a^4$, and there is splined to the shaft near the gear wheel a sleeve $a^5$. The gear and sleeve are provided with clutch faces, as shown, and a shifter, $a^6$, is provided for throwing the clutch sleeve into and out of engagement with said gear. At the end of the shaft opposite from that to which the pulley, $a^3$, is secured there is journaled securely on said shaft a small beveled gear, $a^7$, which is shown in mesh with two beveled gears, $a^8$ $a^9$. Both these beveled gears are journaled loosely on the shaft $a^{10}$. A friction clutch, $a^{11}$, is splined to the shaft, $a^{10}$, and the position of this clutch is controlled by the hand lever, $a^{12}$. (Figs. 3 and 6). The shaft, $a^{10}$, is journaled loosely within stationary bearings, $a^{14}$, near each end thereof (see Figs. 4 and 6) and secured rigidly to the end of the shaft, $a^{10}$, is a worm, $a^{13}$. The hand lever, $a^{12}$, is pivoted to a support, $a^{15}$, projecting from the stationary frame, $a$ (see Fig. 3); the hand lever being pivoted at its lower end at the point $a^{16}$. It is obvious that whenever the hand lever, $a^{12}$, is operated, the clutch, $a^{11}$, may be shifted from a position of engagement with one beveled gear, $a^8$, to one engaging the other beveled gear, $a^9$, or vice versa. The worm, $a^{13}$, is shown in mesh with a gear, $a^{17}$, which gear is journaled securely to one end of the said shaft, $a^1$. (Fig. 6). This shaft, $a^1$, is journaled loosely in the stationary frame, $a$ $a$, and there projects from the shaft, $a^1$, arms, $b$, (Figs. 6 and 1) which are securely fastened to it. Consequently, whenever the shaft, $a^1$, is rotated, the arm, $b$, swings therewith. These arms, $b$ $b$, with the connecting rod, $b^1$, constitute the swinging frame to which is secured the flask and follow-board, as will be more fully explained hereafter.

It is obvious from the description thus far given that power applied through the main operating shaft, $a^2$, to the beveled gear, $a^8$ $a^9$, will raise and lower the swinging frame, $b$ $b$, depending upon whether the friction clutch is in engagement with the one beveled gear or the other.

I have shown in Fig. 6 the friction clutch, $a^{11}$, in intermediate position such that the swinging frame remains stationary in its lowermost position (the position shown in Figs. 2 and 3) until the hand lever, $a^{12}$, is operated to throw the friction clutch into engaging position with one of the beveled gear. I have referred to the gear, $a^4$, on the main operating shaft $a^2$, and adapted to be driven by the clutch sleeve, $a^5$, and this gear is shown in mesh (Fig. 6) with the gear, $a^{18}$, secured to the intermediate shaft, $a^{19}$, so that motion is transmitted from the main operating shaft, $a^2$, to the intermediate shaft, $a^{19}$. This shaft, $a^{19}$, is loosely journaled in the main frame $a$ $a$ of the machine and carries at either end thereof knockers, $a^{20}$, which operate as means for vibrating the flask, as will be shown. It is readily seen that the shifter, $a^6$, is shown in a position (Fig. 6) such that the clutch sleeve, $a^5$, and gear, $a^4$, are in mesh but said gear can be readily disengaged by throwing the shifter to the left and thereby the vibrating motion will be discontinued. The knockers, $a^{20}$, coöperate with friction rollers, $a^{22}$, pivoted to arms, $a^{21}$, (Fig. 2) which arms project from the follow-board, as hereinafter explained. I have also shown anvil-plates, $a^{24}$, and buffers, $a^{23}$, which also project from the follow-board and coöperate with the anvil-plates to cause the ramming of the sand. There is shown guides, $a^{25}$, which project upwardly from the frame, $a$, of the machines, and these guides coöperate with supporting projections, $a^{26}$, which project from the jolting frame, $a^{30}$, and thereby the follow-board is guided in its vibratory movement. This follow-board is indicated by $a^{27}$, (Figs. 2 and 3) and normally rests upon said jolting frame, $a^{30}$. In Fig. 2 I have shown this follow-board and jolting frame elevated from the swinging frame in the act of being vibrated up and down for the purpose of ramming the sand. It is also to be noted that I have preferably shown two knockers at each end of the shaft, $a^{19}$, (Figs. 2 and 6) so that the follow-board and flask are vibrated twice at each complete revolution of the shaft.

In Fig. 9 I have shown a slight modification such that the main operating shaft, $a^2$, is shown intermediate of two shafts, $a^{19}$, and each shaft, $a^{19}$, carries two separate knockers and there are corresponding supporting arms, $a^{21}$, projecting from the follow-board coöperating with these knockers to give a large-sized flask and follow-board sufficient vibratory motion to accomplish the proper ramming of the sand. I have shown a pin, $a^{28}$, on each side of the follow-board, $a^{27}$, (Fig. 4) which acts as a guide for the flask, and I have shown pins, $a^{29}$, at each end of the swinging frame which act as guides for the follow-board $a^{27}$.

The arms, $b\ b$, are connected together at their free ends by the rod, $b^1$, (Figs. 6 and 2) and on this swinging frame the follow-board, $a^{27}$, is first placed and same is automatically locked to the frame as will be explained hereinafter, whenever the frame begins to swing upwardly. The flask, $b^2$, is placed upon the follow-board, the flanges, $d^3$, coöperating with the pins, $a^{28}$, to guide the flask to proper position, and the flask may then be clamped to the follow-board in any ordinary manner.

It is desirable to have the follow-board automatically released from the swinging-frame when the frame is in its lowermost and normal position in order to readily permit the removal of the flask from the frame, but at other times to have the follow-board locked securely to the swinging frame. This is accomplished by the instrumentality of the pivoted pawl, $d^4$, and its associated parts shown in Figs. 5, 1 and 6. This pawl, $b^4$, is pivoted at $b^5$ to one arm, $b$, of the swinging frame, and there are corresponding locking parts at each side of the frame. When the frame is in its lowermost position the tail of the pawl, it strikes the pin, $b^{11}$, secured to the main stationary frame.

The follow-board, $a^{27}$, has a perforated flange projecting therefrom indicated by $b^6$, and the arm, $b$, has a perforated flange, $b^7$. A pin, $b^8$, slides within the perforations of the flanges and is spring-pressed into such position that the follow-board is locked to the swinging-frame, but when the pin, $b^{11}$, throws the pawl, $b^4$, such that the upper end of the pawl strikes the head, $b^9$, of the pin, $b^8$, the pin, $b^8$, will be slid to the right (looking at Fig. 5) against the tension of the spring, $b^{10}$, and the follow-board will thereby be released from locking position with the frame, but it is apparent that when the frame, $b$, swings upwardly and the pawl, $b^4$, swings away from the stationary pin, $b^{11}$, the spring, $b^{10}$, will automatically slide the pin, $b^8$, into locking position; the head, $b^{19}$, on the pin, $b^8$, serving to form a stop and also serving to keep the pawl, $b^4$, in proper position to engage the pin, $b^{11}$. This subvertible swinging frame is shown connected with a gravity weight, $c^1$, by means of a rope, $c$, which is secured to the rod, $b^1$. I have shown (Fig. 1) a chute, $c^2$, which is capable of holding molding sand in large quantities, and the sand is fed from the chute, $c^2$, to the conveyer, $c^3$, the feeding mechanism and conveyer being operated by power and the sand automatically fed and discharged into the movable hopper, $c^4$, which can be shifted from front to rear so as to feed the sand in the proper places in the flask, $b^2$. It is apparent from the fact that the gravity weight, $c^1$, is connected with the movable hopper, $c^4$, and also with the flask, that when the flask is overturned the gravity or counterweight, $c^1$, will drop, and simultaneously move the movable hopper, $c^4$, upwardly thereby moving the same from the path of movement of the flask, and when the movable flask is restored to normal position the movable hopper, $c^4$, will be automatically thrown back to normal position shown in Fig. 1.

Having explained the different parts, a brief description of the operation is this: Power is applied in any ordinary way to the machine, and after the sand has been partly fed into the flask, or if desirable during the major part of the time it is being fed into the flask, the follow-board, $a^{27}$, is vibrated by shifting the hand lever, $a^6$, so that the clutch sleeve, $a^5$, and gear, $a^4$, will be thrown into engagement. The knockers, $a^{20}$, will thereupon accomplish a very desirable ramming of the sand. When sufficient ramming has been done, the shifter, $a^6$, is again operated to disengage the clutch and the top of the flask is thereupon secured to said flask and the hand lever, $a^{12}$, is operated to swing the subvertible frame, it being understood that the flask has been clamped to the follow-board, the follow-board being automatically locked to the swinging frame at the commencement of the swinging movement thereof. The frame is swung until it is completely overturned upon a stationary support, such as that indicated in Fig. 1 by $c^5$. The flask is then disengaged from the follow-board and the hand-lever, $a^{12}$, is again operated to throw the clutch, $a^{11}$, to its opposite extreme position for the purpose of returning the swinging frame to normal position. In this manner the flask is deposited at a point in proximity to the machine, and the swinging frame is returned to normal position ready for another operation. In the initial return movement of the swinging frame, the follow-board, to which is secured the pattern, will be raised substantially vertically, thereby removing the pattern from the flask without disturbing the mold. This is permitted by reason of the tapered guide pins, $a^{28}$.

Having thus described my invention, I claim:

1. In a machine of the character mentioned, the combination of a swinging invertible frame, a main operating shaft, and a molding flask secured to the frame, means connected with the shaft for vibrating the flask, substantially as specified.

2. In a machine of the character mentioned, a main operating device, a molding flask, devices for vibrating said flask operated by the main operating means, means for overturning the flask also operated by the main operating means, substantially as specified.

3. In a machine of the character mentioned, a main operating device, a swinging flask, vibrating mechanism for said swinging flask operated by the first-mentioned device, means for overturning the flask after same has been vibrated by said first-mentioned device, substantially as specified.

4. In a machine of the character mentioned, a main operating device, an intermediate shaft rotated by said device, a frame connected with said shaft and swinging in unison therewith, a flask removably secured to the frame, vibrating mechanism for said flask connected with the main operating device, means for overturning the frame and flask after the flask has been vibrated, substantially as specified.

5. In a machine of the character mentioned, a main operating device, a swinging invertible frame, a follow-board and means for automatically securing the follow board to the frame during its swinging movement, a flask removably secured to the follow-board, vibrating mechanism for said flask and follow-board operated by the main operating device, means for overturning the flask and follow-board after same have been vibrated, substantially as specified.

6. In a machine of the character described, the combination of a main operating device, an intermediate shaft oscillated by said device, a swinging frame secured to said shaft, a follow-board means for automatically securing the same to the swinging frame during its movement, a flask removably secured to the follow-board, means for vibrating the follow-board and flask, and means for overturning the frame, substantially as specified.

7. In a machine of the character mentioned, the combination of a main operating device, a swinging frame operated by said device, a flask and means for automatically securing same to said frame during its swinging movement and automatically released therefrom in its normal position, means for vibrating the flask in its normal position, and means for overturning the frame and the flask, substantially as specified.

8. In a machine of the character mentioned, a main operating device, a swinging frame connected with said device, a follow-board and means for automatically securing same to said frame by its swinging movement and released in the normal position of the frame, a flask connected with the follow board, means for vibrating the flask and follow-board, and means for overturning the frame, and means for removing the follow-board from the flask and returning the frame and follow-board to normal position by the main operating device, substantially as specified.

9. In a machine of the character mentioned, a main operating device, a frame oscillated by the main operating device, a follow-board and means for automatically securing same to the frame during the oscillating movement, a flask, tapered guides between the flask and follow-board, means for vibrating the flask and follow-board when the frame is in normal position, means for removing the follow-board from the flask after the frame has been swung in one direction, substantially as specified.

10. In a machine of the character mentioned, the combination of a conveyer, a movable hopper connected therewith, a main operating device, a swinging flask located below the conveyer, means operated by said main operating device for overturning the flask, and means for automatically moving the hopper out of normal position by the overturning movement of said flask, substantially as specified.

11. In a machine of the character mentioned, a main operating device, a swinging frame, and a flask removably secured to the frame, connections between the frame and the main operating device, knockers, and connections between the knockers and the main operating device, a clutch controlling the vibrating movement of the flask by the knockers, substantially as specified.

In testimony whereof, I have hereunto set my hand this 21st day of March, 1907.

OLIVER W. KELLY.

Witnesses:
 CHAS. I. WELCH,
 CLARA GALLAGHER.